(12) United States Patent
Ishizaki

(10) Patent No.: US 7,070,531 B2
(45) Date of Patent: Jul. 4, 2006

(54) HYDROMECHANICAL TRANSMISSION

(75) Inventor: Naoki Ishizaki, Minamikawachi-machi (JP)

(73) Assignee: Komatsu Ltd., Tokyo (JP)

( * ) Notice: Subject to any disclaimer, the term of this patent is extended or adjusted under 35 U.S.C. 154(b) by 146 days.

(21) Appl. No.: 10/836,360

(22) Filed: Apr. 29, 2004

(65) Prior Publication Data

US 2004/0242357 A1 Dec. 2, 2004

(30) Foreign Application Priority Data

May 27, 2003 (JP) ............................. 2003-148537

(51) Int. Cl.
*F16H 47/04* (2006.01)
(52) U.S. Cl. ........................................................ 475/75
(58) Field of Classification Search .................. 475/72, 475/75, 81, 82, 83
See application file for complete search history.

(56) References Cited

U.S. PATENT DOCUMENTS

| | | | | |
|---|---|---|---|---|
| 3,074,296 A | * | 1/1963 | Ebert | 475/75 |
| 4,983,149 A | * | 1/1991 | Kita | 475/82 |

FOREIGN PATENT DOCUMENTS

| | | | | |
|---|---|---|---|---|
| DE | 37 33 152 | * | 4/1989 | 475/75 |
| JP | 2004-340271 A | | 12/2004 | |
| JP | 2004-353689 A | | 12/2004 | |

OTHER PUBLICATIONS

H. Mitsuya et al; Development of Hydromechanical Transmission (HMT) For Bulldozers; SAE Technical Paper Series, 941722, pp. 1-10; 1994.

* cited by examiner

*Primary Examiner*—Sherry Estremsky
(74) *Attorney, Agent, or Firm*—Frishauf, Holtz, Goodman & Chick, P.C.

(57) ABSTRACT

A hydromechanical transmission having a continuously variable transmission function and occupying a small area for installation is provided. For this purpose, the transmission includes a driving source (3), a planetary gear speed reducer (5) connected to the driving source, a variable displacement hydraulic pump (11), which is connected to the planetary gear speed reducer, and to which one part of an output force of the driving source is outputted, an output shaft (717), which is connected to the planetary gear speed reducer, and to which the other part of the output force of the driving source is outputted, a first and a second variable displacement hydraulic motors (31, 37) receiving pressure oil from the hydraulic pump and outputting a driving force to the output shaft, and a clutch (45) placed between the second hydraulic motor (37) and the output shaft.

2 Claims, 3 Drawing Sheets

HYDROMECHANICAL TRANSMISSION

TECHNICAL FIELD

The present invention relates to a hydromechanical transmission (HMT), and particularly relates to a hydromechanical transmission suitable for a vehicle with a wide speed variation range of continuously variable transmission.

BACKGROUND ART

Conventionally, a transmission for continuously changing a speed by using a hydraulic driving device in which a hydraulic pump and a hydraulic motor are combined is generally known. A transmission for continuously changing a speed by using a hydraulic driving device and a planetary gear speed reducer, and changing a speed stepwise by using a hydromechanical transmission and a multi-stage transmission is known (for example, see pp. 1–10 SAE TECHNICAL PAPER SERIES 941722, Hiroyuki Mitsuya et al, SAE INTERNATIONAL. 1994). In this document, when a hydraulic driving device and a planetary gear speed reducer are used, input torque is split, then one part of the torque enters hydraulic pump of the hydraulic driving device to drive a hydraulic motor, and the output force of the hydraulic motor is inputted into a sun gear. The other part is inputted into a planetary gear of the planetary gear speed reducer, and predetermined torque is outputted from a ring gear. In this situation, the ring gear is made variable in accordance with the rotational speed of the sun gear by the output force of the hydraulic motor.

In the case of using the hydromechanical transmission and the multi-stage transmission, the input torque is split, one part of the torque enters the hydraulic pump of the hydraulic driving device to drive the hydraulic motor, and the output force of the hydraulic motor is inputted into the planetary gear. The other part of the torque is inputted into the sun gear of the planetary gear speed reducer via the multi-stage transmission, and is outputted from the ring gear. In this situation, the torque is outputted as a predetermined continuous speed from the ring gear in accordance with the inputted rotational speed of the planetary gear. This transmission changes the speed from zero to a predetermined speed as a pure hydraulic driving device at the time of start of traveling, and continuously changes the speed with the hydromechanical transmission from the predetermined speed. However, this method is accompanied by shift by gears, though this method is called continuous variable transmission, and therefore there arises the problem of occurrence of gear change shock. In addition, a transmission for changing speed is required, thus causing the problem that the cost becomes high.

SUMMARY OF THE INVENTION

The present invention is made in view of the above-described problems, and has its object to provide a hydromechanical transmission having a completely continuously variable transmission function accompanied by no gear shift, a structure at low cost and favorable transmission efficiency and occupying only a small area for installation.

In order to attain the above-described object, the hydromechanical transmission according to the present invention includes a driving source, a planetary gear speed reducer connected to the driving source, a variable displacement hydraulic pump, which is connected to the planetary gear speed reducer, and to which one part of an output force of the driving source is outputted, an output shaft, which is connected to the planetary gear speed reducer, and to which the other part of the output force of the driving source is outputted, a first variable displacement hydraulic motor receiving pressure oil from the variable displacement hydraulic pump and outputting a driving force to the output shaft, a second variable displacement hydraulic motor receiving the pressure oil from the variable displacement hydraulic pump and outputting a driving force to the output shaft, and a clutch placed between the second variable displacement hydraulic motor and the output shaft.

According to the above constitution, the output force of the driving source is split by the planetary gear speed reducer, one part of it is outputted to the hydraulic pump, and the other part of it is outputted to the output shaft to drive each of them. The hydraulic pump supplies pressure oil to the two variable displacement hydraulic motor, and changes the vehicle speed continuously by making a displacement volume of one of the hydraulic motors zero at a first predetermined vehicle speed, and making a displacement volume of the other one of the hydraulic motors zero at a second predetermined vehicle speed.

In the hydromechanical transmission, a speed reducer placed between the second variable displacement hydraulic motor and the output shaft may be further included. According to this constitution, the speed reduction ratio is made large by using the speed reducer, thus making it possible to obtain high output force even by using the compact hydraulic motor and make the displacement volume small, and the hydraulic motor can be made compact. Since the second hydraulic motor is set to have the displacement volume of zero at the allowable rotational speed first and cut off from the output shaft with the clutch to prevent the rotational speed from rising to a higher speed than this, the rotational speed of the hydraulic motor can be set at the allowable rotational speed.

In the hydromechanical transmission, a normal and a reverse rotation clutches placed between the planetary gear speed reducer and the first variable displacement hydraulic motor may be further included, and the variable displacement hydraulic pump may be a two-way variable displacement hydraulic pump. According to this constitution, the normal and the reverse rotation clutches are placed at the output shaft, and the transmission torque is small, thus making it possible to reduce an area for installation of the normal and the reverse rotation clutches, and reduce the cost.

BEST MODE FOR CARRYING OUT THE INVENTION

Figure 2:
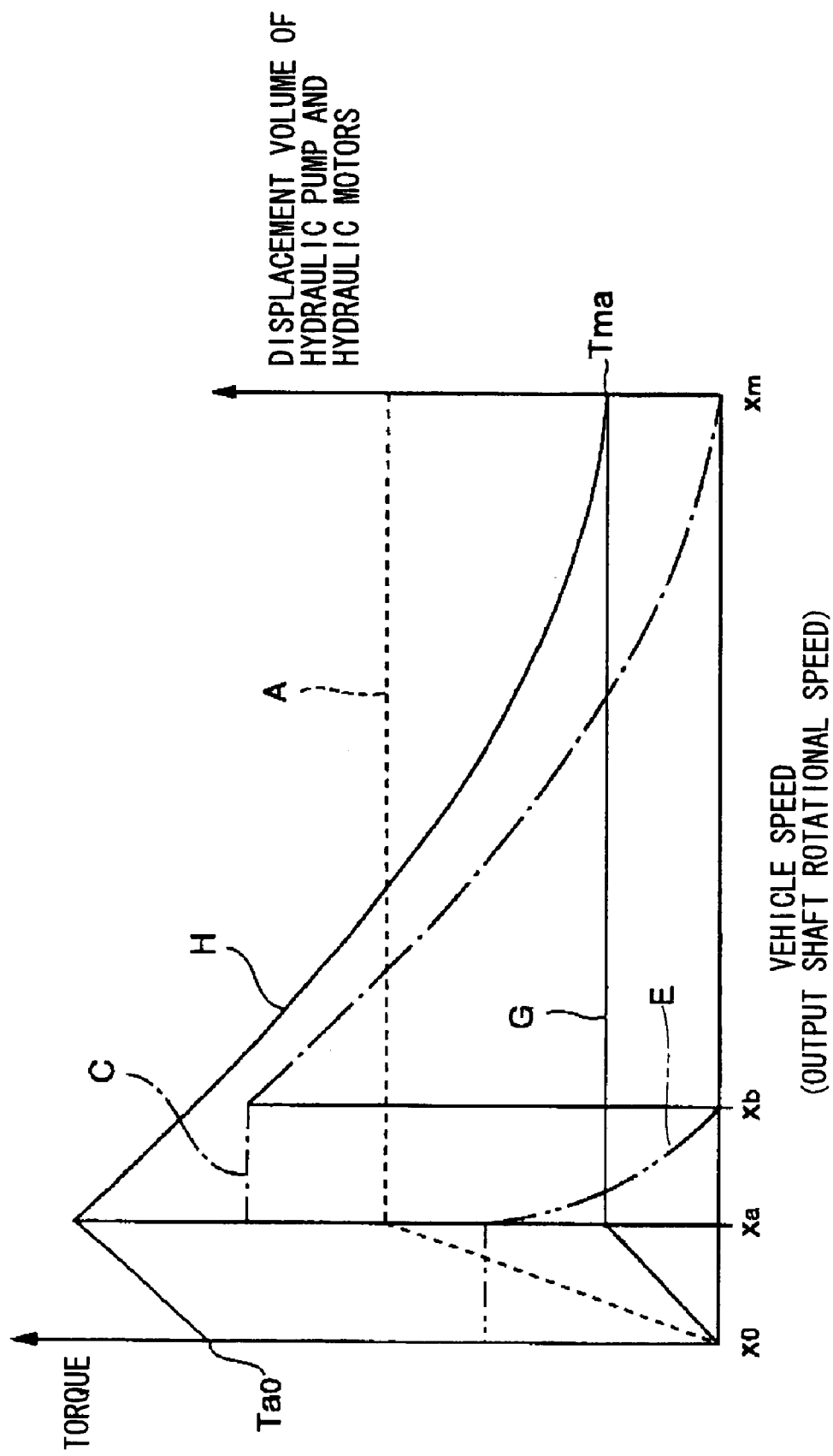
FIG. 2 is a graph explaining the relationship between a vehicle speed, displacement volumes of a hydraulic pump and hydraulic motors, and torque in the embodiment.
Figure 3:
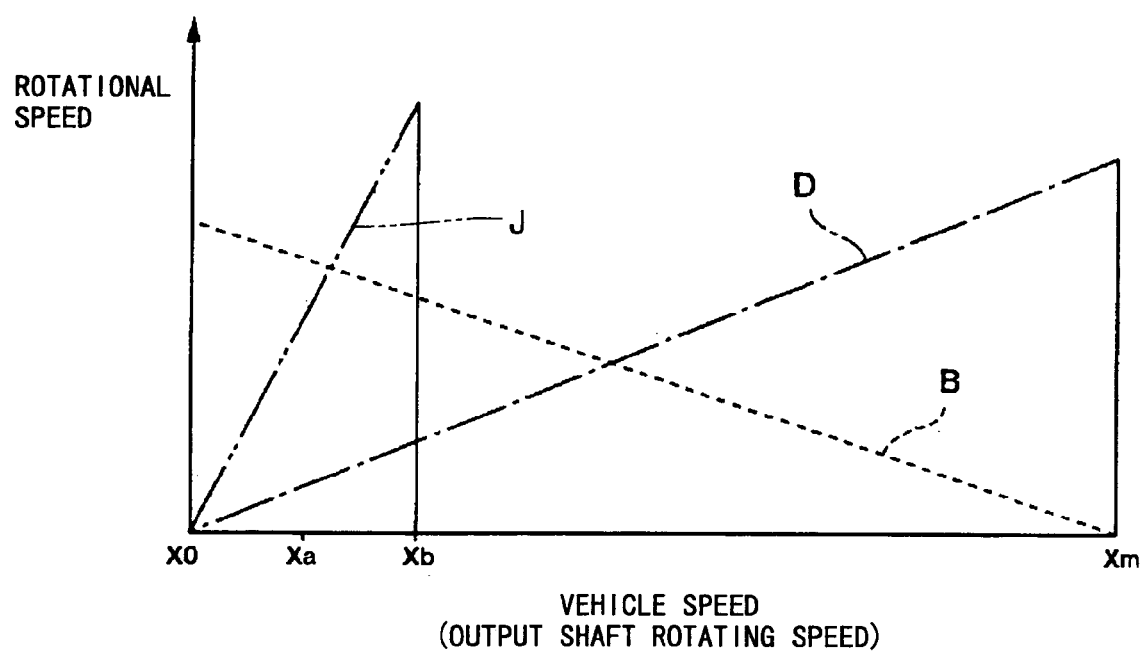
FIG. 3 is a graph explaining the relationship between the vehicle speed and rotational speeds in the embodiment.

An embodiment of a hydromechanical transmission according to the present invention will be explained with reference to the drawings, hereinafter. First, the hydromechanical transmission of the embodiment will be explained with use of FIG. 1 to FIG. 3. FIG. 2 shows a vehicle speed, which is a rotational speed of an output shaft, in the horizontal axis, and output torque in the vertical axis. FIG. 3 shows the vehicle speed, which is the rotational speed of the output shaft, in the horizontal axis, and a rotational speed of a hydraulic pump or hydraulic motors in the vertical axis.

Figure 1:
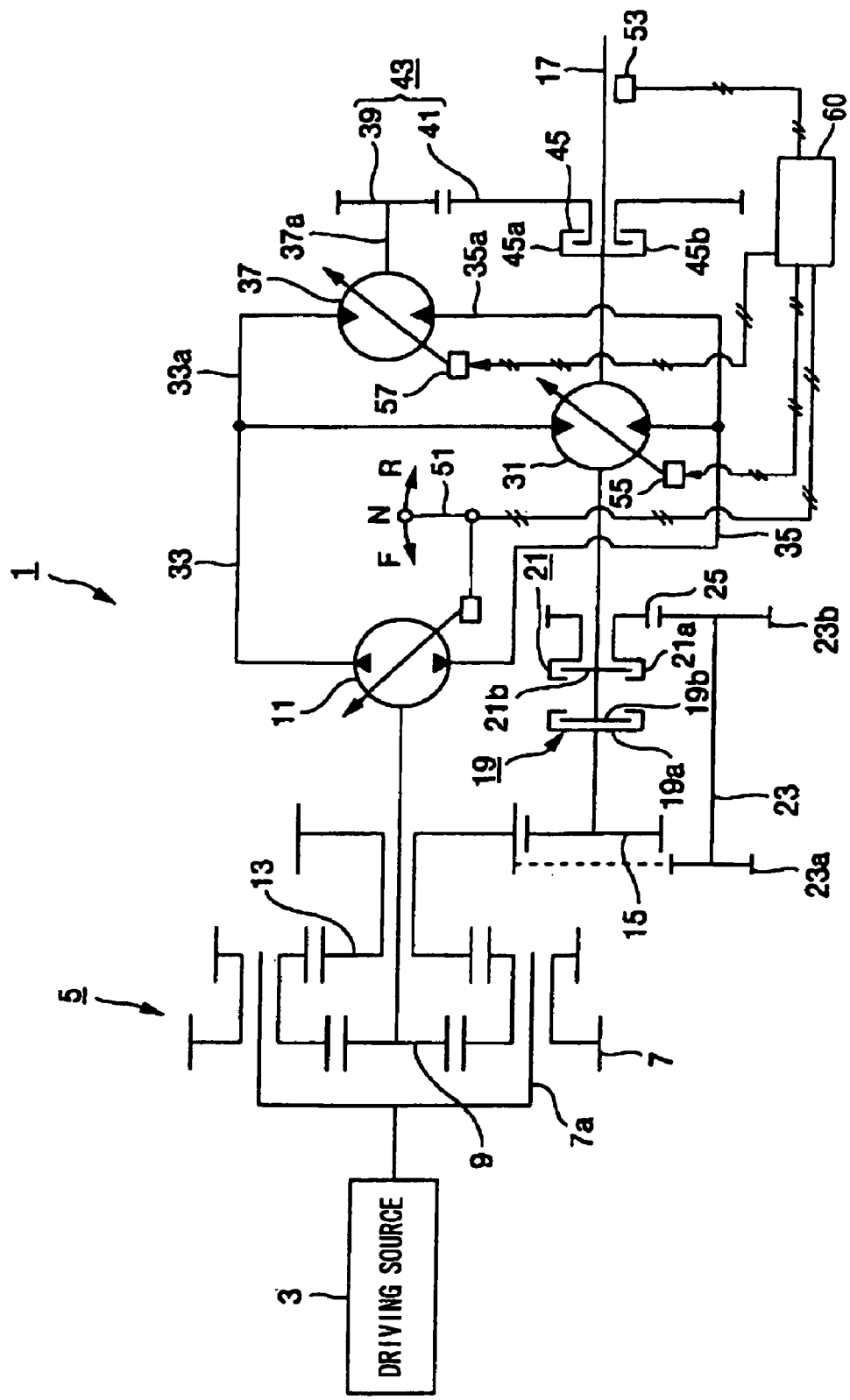
FIG. 1 is a block diagram of a hydromechanical transmission according to an embodiment of the present invention.

In FIG. 1, in a hydromechanical transmission 1, a driving source 3 such as an engine is connected to a planetary gear 7 via a planetary carrier 7a of a planetary gear speed reducer 5 (hereinafter, called a planetary speed reducer 5), a hydraulic pump 11 is connected to a first sun gear 9, and further, an output shaft 17 is connected to a second sun gear 13 via a normal rotation gear 15. Thereby, output torque of the driving source 3 is split into two in the planetary speed reducer 5, and one is outputted to the hydraulic pump 11 from the first sun gear 9, and the other is outputted to the output shaft 17 from the second sun gear 13. The output shaft 17 is provided with a normal rotation clutch 19 and a reverse rotation clutch 21 in parallel between the planetary speed reducer 5 and a first hydraulic motor 31.

The normal rotation clutch 19 receives the output torque of the driving source 3 which is outputted by the planetary speed reducer 5 by a mechanical line from the normal rotation gear 15 meshed with the second sun gear 13. The normal rotation clutch 19 is constituted of a normal rotation clutch case 19a integrally formed with the normal rotation gear 15, and a normal rotation clutch plate 19b integrally formed with the output shaft 17. The normal rotation clutch 19 is connected at the time of normal rotation and receives the output torque of the driving source 3 from the planetary speed reducer 5, and transmits it to the output shaft 17 as normal rotation torque. A reverse rotation input gear 23 is meshed with the second sun gear 13. One end side gear 23a of the reverse rotation input gear 23 is meshed with the second sun gear 13, and the other end side gear 23b is meshed with a reverse rotation gear 25, respectively. Torque of the second sun gear 13 is transmitted to the reverse rotation clutch 21 by a mechanical line via the reverse rotation gear 25.

The reverse rotation clutch 21 is constituted of a reverse rotation clutch case 21a formed integrally with the reverse rotation gear 25, and a reverse rotation clutch plate 21b formed integrally with the output shaft 17. The reverse rotation clutch 21 is connected at the time of reverse rotation, and receives the output torque of the driving source 3 from the planetary speed reducer 5, and transmits it to the output shaft 17 as reverse rotation torque. The first hydraulic motor 31 is provided behind the normal rotation clutch 19 and the reverse rotation clutch 21 placed at the output shaft 17, and the output torque of the first hydraulic motor 31 is outputted to the output shaft 17. As a result, the output torque of the first hydraulic motor 31 is outputted to the output shaft 17 without passing through the normal rotation clutch 19 and the reverse rotation clutch 21.

The first hydraulic motor 31 is connected via pipes 33 and 35, and a second hydraulic motor 37 is connected via pipes 33a and 35a branching from the pipes 33 and 35, to the hydraulic pump 11 connected to the first sun gear 9, in parallel. A motor output gear 39 is attached to an output shaft 37a of the second hydraulic motor 37, and the motor output gear 39 is meshed with a motor output shaft gear 41. The motor output gear 39 and the motor output shaft gear 41 form a motor speed reducer 43, and transmits the rotational speed of the second hydraulic motor 37 to the output shaft 17 while reducing the rotational speed. As a result, the second hydraulic motor 37 can output large torque to the output shaft 17 with the compact second hydraulic motor 37.

The motor output shaft gear 41 is connected to the output shaft 17 via a motor clutch 45 to avoid transmitting the large rotational speed of the output shaft 17 to the second hydraulic motor 37. The motor clutch 45 is formed by a motor clutch case 45a formed integrally with the output shaft 17, and a motor clutch plate 45b formed integrally with the motor output shaft gear 41, and the motor clutch 45 outputs the output torque of the second hydraulic motor 37 to the output shaft 17 of the motor clutch 45 when it is connected.

The hydraulic pump 11 being a variable displacement hydraulic pump is formed by a two-way variable displacement hydraulic pump, and a swash plate is tilted with a tilting angle tilted in a normal direction or a reverse direction from a neutral position by receiving the operation of an operating lever 51. A displacement volume of the hydraulic pump 11 sequentially increases from a point Xo to a point Xa of a first predetermined vehicle speed, and when the vehicle speed exceeds the point Xa of the first predetermined vehicle speed, the swash plate remains at a fixed predetermined angle and keeps a maximum displacement volume, as shown by the broken line A in FIG. 2. The hydraulic pump 11 discharges pressure oil to the pipe 33 or pipe 35 corresponding to the operating direction of the operating lever 51.

As shown by the broken line B in FIG. 3, the hydraulic pump 11 sequentially decreases in the rotational speed by the planetary speed reducer 5 with an increase in the vehicle speed, namely, the increase in the rotational speed of the output shaft 17. Namely, the rotational speed of the hydraulic pump 11 sequentially decreases through the first sun gear 9 with the increase in the rotational speed of the second sun gear 13.

The first hydraulic motor 31 which is a variable displacement hydraulic motor is formed by a one-way variable displacement hydraulic motor, attached to the output shaft 17, its output torque is outputted to the output shaft 17, and added to the mechanical torque from the planetary speed reducer 5 via the normal rotation clutch 19 or the reverse rotation clutch 21. As for a displacement volume of the first hydraulic motor 31, its swash plate tilts with a tilting angle tilted to a neutral position from a maximum tilt by a first swash plate angle control mechanism 55 receiving a command from the controller 60 based on a command of the lever 51, thereby making the displacement volume variable.

As for the displacement volume of the first hydraulic motor 31, the maximum displacement volume is fixed from the point Xo to the point Xb of the first predetermined vehicle speed by the first swash plate angle control mechanism 55, and the displacement volume is sequentially decreased after the vehicle speed exceeds the point Xb of the first predetermined vehicle speed until the vehicle speed reaches a point Xm of the maximum vehicle speed and the displacement volume is set to be zero at the point Xm of the maximum vehicle speed, as shown by the alternate long and short dash line C in FIG. 2. The first hydraulic motor 31 sequentially increases in the rotational speed in accordance with the output shaft 17 from the point Xo at which the vehicle speed is zero to the point Xm of the maximum vehicle speed as shown by the alternate long and short dash line D in FIG. 3.

The second hydraulic motor 37 which is a variable displacement hydraulic motor is formed by a one-way variable displacement hydraulic motor, and is attached to the motor output gear 39. The output torque of the second hydraulic motor 37 is outputted to the output shaft 17 via the motor speed reducer 43 and the motor clutch 45, and is added to the mechanical torque from the first hydraulic motor 31 and the planetary speed reducer 5 via the normal rotation clutch 19 or the reverse rotation clutch 21. In the second hydraulic motor 37, its swash plate is tilted with the tilting angle tilted from the maximum tilt to the neutral position by the second swash plate angle control mechanism 57 receiving a command from the controller 60 based on the command of the lever 51, thereby making the displacement volume variable.

As for the displacement volume of the second hydraulic motor 37, the maximum displacement volume is fixed from the point Xo to the point Xa of the first predetermined vehicle speed by a second swash plate control mechanism 57, and the displacement volume is sequentially decreased after the vehicle speed exceeds the point Xa of the first predetermined vehicle speed until the vehicle speed reaches the point Xb of the second predetermined vehicle speed, and the displacement volume is set to be zero at the point Xb of the second predetermined vehicle speed, as shown by the two-dot chain line E in FIG. 2. The second hydraulic motor 37 sequentially increases in the rotational speed from the vehicle speed of zero to the point Xb of the second predetermined vehicle speed, as shown by the two-dot chain line J in FIG. 3.

An operation in the above-described constitution will be explained with use of FIG. 1 to FIG. 3. First, the case in which the operating lever 51 is at the neutral position N will be explained. In the hydraulic pump 11, the swash plate which is tilted by receiving the operation of the operating lever 51 is in the neutral position, and its displacement volume is zero. Due to this, the hydraulic pump 11 does not discharge pressure oil to the first hydraulic motor 31 and the second hydraulic motor 37, and its rotational speed is zero. At the same time, the command of the operating lever 51 is outputted to the normal rotation clutch 19 and the reverse rotation clutch 21, and connections of both the clutches are cut off. Due to this, the output torque of both the hydraulic motors 31 and 37 and the driving source 3 is not transmitted to the output shaft 17 through the mechanical line from the planetary speed reducer 5 and the normal rotation gear 15, and the output shaft 17 does not rotate, thus making the output torque zero.

Next, the case in which the operating lever 51 is operated in the normal direction F from the neutral position N, and for example, the vehicle travels forward will be explained. The hydraulic pump 11 receives the operation of the operating lever 51 and tilts the swash plate from the neutral position to the normal rotation direction, then the displacement volume sequentially increases from zero at the point Xo along the broken line A, and the hydraulic pump 11 discharges pressure oil to the first hydraulic motor 31 and the second hydraulic motor 37. At the same time, the command of the operating lever 51 is outputted to the normal rotation clutch 19 and the motor clutch 45, and the normal rotation clutch 19 and the motor clutch 45 are connected. As a result, both the hydraulic motors 31 and 37 outputs combined motor output torque Th to the output shaft 17. The second sun gear 13 of the planetary speed reducer 5 outputs the output torque of the driving source 3 to the output shaft 17 as mechanical torque Tm shown by the line G in FIG. 2 via the normal rotation gear 15 and the normal rotation clutch 19. The torque of the output shaft 17 becomes composite torque Ta (=Th+Tm) shown by the line H in FIG. 2, which is the total of the motor output toque Th and the mechanical torque Tm.

The case in which the output shaft 17 does not rotate due to traveling resistance at the time of starting drive is considered. In this case, the second sun gear 13 of the planetary speed reducer 5 is locked by the normal rotation gear 15, and the output torque of the driving source 3 is outputted to the hydraulic pump 11 from the first sun gear 9. Due to stoppage of the output shaft 17, the first hydraulic motor 31 and the second hydraulic motor 37 connected to the output shaft 17 via the motor clutch 45 and the motor speed reducer 43 stop, and therefore the discharge oil of the hydraulic pump 11 is discharged from a relief valve (not shown).

By the discharge pressure of the hydraulic pump 11, output torque occurs to the first hydraulic motor 31, and is outputted to the output shaft 17 to which it is attached. At the same time, the output torque of the second hydraulic motor 37 is increased by the motor speed reducer 43, outputted to the output shaft 17 via the motor clutch 45, then added to the output torque of the first hydraulic motor 31, and outputted to the output shaft 17 as the motor output torque Th. As a result, the output shaft 17 receives a composite torque Tao which is the total of the motor output torque Th which is the total of the torque of the both hydraulic motors 31 and 37, and the mechanical torque Tm from the ring gear 13 of the planetary speed reducer 5, and therefore the output shaft 17 outputs a large driving force.

Next, the case in which the output shaft 17 starts rotating will be considered. The displacement volume of the hydraulic pump 11 is increased following the command of the operating lever 51 as a speed command lever, and with this, the second sun gear 13 starts rotating, and sequentially reduces the rotational speed of the first sun gear 9 along the broken line B. In accordance with this, the rotational speed of the hydraulic pump 11 sequentially reduces up to the point Xm of the maximum vehicle speed. Here, the displacement volume of the hydraulic pump 11 is increased up to the point Xa of the first predetermined vehicle speed, and therefore the hydraulic pump 11 increases in the displacement volume until the vehicle speed reaches the point Xa of the first predetermined vehicle speed as shown by the broken line A. Therefore, the discharge oil amount increases even the rotational speed reduces. As a result, both the hydraulic motors 31 and 37 increase in the rotational speed, and the vehicle speed also increases.

When the vehicle speed reaches the point Xa of the first predetermined vehicle speed, the second hydraulic motor 37 sequentially decreases the displacement volume of the second hydraulic motor 37 following the command of the operating lever 51 by the second swash plate angle control mechanism 57, and the rotational speed of the second hydraulic motor 37 increases corresponding to the amount by which the displacement volume decreases. Here, in the first hydraulic motor 31, the maximum displacement volume is kept, but it increases in the rotational speed by receiving the oil amount by which the second hydraulic motor 37 decreases the oil amount, and the increase in the discharge amount of the hydraulic pump 11 to increase the rotational speed of the output shaft 17. The displacement volume of the second hydraulic motor 37 is decreased after the vehicle speed exceeds the point Xa of the first predetermined vehicle speed until the vehicle speed reaches the point Xb of the second predetermined vehicle speed.

When the vehicle speed reaches the point Xb of the second predetermined vehicle speed, the second swash plate angle control mechanism 57 decreases the displacement volume of the second hydraulic motor 37 to zero, and at the same time as this, the clutch 45 is disengaged. Thereby, the second hydraulic motor 37 is cut off from the connection with the output shaft 17, and therefore, even if the output shaft 17 rotates at a high speed, the second hydraulic motor 37 is not influenced by this.

The first hydraulic motor 31 sequentially reduces the displacement volume by the first swash plate angle control mechanism 55, and the oil amount it receives also decreases as a result of the reduction in the rotational speed of the hydraulic pump 11. However, the first hydraulic motor 31 increases the rotational speed by increasing the amount by which the displacement volume decreases, and therefore it increases the rotational speed of the output shaft 17. The displacement volume of the first hydraulic motor 31 is decreased after the vehicle speed exceeds the point Xb of the second predetermined speed until the vehicle speed reaches the point Xm of the maximum vehicle speed.

At the point where the first swash plate angle control mechanism 55 decreases the displacement volume of the first hydraulic motor 31 to zero, the vehicle speed reached the maximum vehicle speed. The volume of the first hydraulic motor 31 is zero, and therefore the rotational speed of the hydraulic pump 11 becomes zero to stop the first sun gear 9. Due to the stoppage of the first sun gear 9, the planetary speed reducer 5 outputs all the output force of the driving source 3 to the output shaft 17 as total mechanical torque Tma by the mechanical line from the ring gear 13 via the normal rotation gear 15 and the normal rotation clutch 19.

As for the case in which the operating lever 51 is returned to the neutral position N from the operations F and R, the reverse process from the process of increasing the vehicle speed is performed. The detailed explanation will be omitted. The case in which the operating lever 51 is operated from the neutral position N to the reverse rotation direction R and, for example, the vehicle travels rearward is the same as the case of the normal rotation F, and therefore the detailed explanation will be omitted.

The driving source 3, the hydraulic pump 11 and the output shaft 17 may be connected to any of the planetary gear 7, the first sun gear 9 and the second sun gear 13 by properly selecting any one of them without being limited to the above-described embodiment. The planetary speed reducer 5 of the double-sun planetary type is shown, but the planetary speed reducer 5 may be of an ordinary one-stage planetary gear type, and the motor speed reducer 43 may adopt a planetary gear type. Though the two-way variable displacement hydraulic pump is used as the hydraulic pump 11, a one-way variable displacement hydraulic pump and a change-over valve may be used in combination. The driving source may be an electric motor.

What is claimed is:

1. A hydromechanical transmission, comprising:
   a driving source;
   a planetary gear speed reducer connected to said driving source;
   a variable displacement hydraulic pump, which is connected to said planetary gear speed reducer, and to which a first part of an output force of said driving source is outputted;
   an output shaft, which is connected to said planetary gear speed reducer, and to which a second part of the output force of said driving source is outputted;
   a first variable displacement hydraulic motor which receives pressure oil from said variable displacement hydraulic pump and outputs a driving force to said output shaft;
   a second variable displacement hydraulic motor which receives pressure oil from said variable displacement hydraulic pump and outputs a driving force to said output shaft;
   a clutch placed between said second variable displacement hydraulic motor and said output shaft; and
   a normal clutch and a reverse rotation clutch placed between said planetary gear speed reducer and said first variable displacement hydraulic motor;
   wherein said variable displacement hydraulic pump comprises a two-way variable displacement pump.

2. The hydromechanical transmission according to claim 1, further comprising:
   a speed reducer placed between said second variable displacement hydraulic motor and said output shaft.

* * * * *